United States Patent
Kim

(10) Patent No.: US 10,993,133 B2
(45) Date of Patent: Apr. 27, 2021

(54) METHOD AND APPARATUS FOR REPORTING MEASUREMENT RESULT

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/339,791

(22) PCT Filed: Sep. 29, 2017

(86) PCT No.: PCT/KR2017/010933
§ 371 (c)(1),
(2) Date: Apr. 5, 2019

(87) PCT Pub. No.: WO2018/080044
PCT Pub. Date: May 3, 2018

(65) Prior Publication Data
US 2020/0045573 A1    Feb. 6, 2020

Related U.S. Application Data

(60) Provisional application No. 62/412,255, filed on Oct. 24, 2016, provisional application No. 62/421,973, filed on Nov. 14, 2016.

(51) Int. Cl.
*H04W 24/10* (2009.01)
*H04W 84/12* (2009.01)
(Continued)

(52) U.S. Cl.
CPC ............ *H04W 24/10* (2013.01); *H04W 24/02* (2013.01); *H04W 36/0022* (2013.01); *H04W 36/0061* (2013.01); *H04W 84/12* (2013.01)

(58) Field of Classification Search
CPC ............. H04W 24/10; H04W 36/0022; H04W 36/0061; H04W 24/02; H04W 84/12
See application file for complete search history.

(56) References Cited

U.S. PATENT DOCUMENTS 10,194,425 B2 * 1/2019 Van Der Velde ..... H04L 5/0032
2013/0210438 A1   8/2013 Martin et al.
(Continued)

FOREIGN PATENT DOCUMENTS

WO    2016123568    8/2016

OTHER PUBLICATIONS

3GPP TS 36.331 v13.3.0, "3GPP; TSGRAN: E-UTRA; RRC, Protocol Specification (Release 13)," Oct. 3, 2016, see pp. 121-144.
3GPP TS 36.331 v13.2.0, Section 5.5.4.11 to 5.5.4.13.

*Primary Examiner* — Brian T O Connor
(74) *Attorney, Agent, or Firm* — Dentons US LLP

(57) ABSTRACT

Provided are a method for a terminal for reporting a measurement result in a wireless communication system, and an apparatus supporting the method. The method may comprise the steps of: receiving a measurement configuration comprising a measurement object and reporting configuration, the reporting configuration comprising a first measurement reporting triggering condition to be applied to a first wireless local area network (WLAN) not included in the measurement object; determining that measurement reporting for the first WLAN not included in the measurement object is permitted; measuring the first WLAN not included in the measurement object; and, if the measurement result for the first WLAN satisfies the first measurement reporting triggering condition, then reporting the measurement result for the first WLAN not included in the measurement object.

15 Claims, 14 Drawing Sheets

(51) Int. Cl.
*H04W 36/00* (2009.01)
*H04W 24/02* (2009.01)

(56) References Cited

U.S. PATENT DOCUMENTS

| | | |
|---|---|---|
| 2015/0043560 A1 | 2/2015 | Guo et al. |
| 2016/0165494 A1 | 6/2016 | Warburton et al. |
| 2018/0063765 A1* | 3/2018 | Bansal .............. H04W 36/0088 |
| 2019/0021021 A1* | 1/2019 | Thangarasa ............. H04W 4/70 |
| 2020/0077385 A1* | 3/2020 | Van Der Velde ....... H04L 5/001 |

* cited by examiner (a)

(b)

METHOD AND APPARATUS FOR REPORTING MEASUREMENT RESULT

CROSS-REFERENCE TO RELATED APPLICATIONS

This application is the National Stage filing under 35 U.S.C. 371 of International Application No. PCT/KR2017/010933, filed on Sep. 29, 2017, which claims the benefit of U.S. Provisional Applications No. 62/412,255 filed on Oct. 24, 2016, and No. 62/421,973 filed on Nov. 14, 2016, the contents of which are all hereby incorporated by reference herein in their entirety.

BACKGROUND OF THE INVENTION

Field of the Invention

The present invention relates to a wireless communication system, and more particularly, to a method in which a terminal reports a measurement result for a wireless local area network (WLAN) not included in a measurement object, and an apparatus supporting the method.

Related Art

In order to meet the demand for wireless data traffic sorting since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

Recently, with an increase in data traffic usage, methods have been required that sufficiently satisfy the demand on data use from customers without involving large-scale investment in facilities or a huge increase in communication fees. Accordingly, in order to cope with a data explosion, a large number of wireless service carriers adopt one solution of offloading wireless data traffic concentrating on 3G or LTE networks by utilizing a WLAN communication method available in an unlicensed band, such as the ISM bands.

An unlicensed band is characterized in that since wireless service carriers do not need to obtain the exclusive right to use frequencies in this band through an auction process or the like, an elaborately-designed WLAN is capable of handling significant levels of capacity at remarkably low costs in this band, as compared with a network established in a licensed band. However, since large numbers of communication equipment may be used in an unlicensed band without restriction under rules associated with a certain level of adjacent band protection and in-band interference, a communication service using the unlicensed band may not guarantee as high communication quality as a communication service through a licensed band within the exclusive right can provide. In addition, although standardization for interworking HSPA or LTE services as 3GPP technologies with Wi-Fi as an IEEE technology has been in progress since 2002, it is difficult to completely integrate two networks with different network structures and to provide a service in view of handover and guaranteed QoS.

In order to solve these problems, LTE technology in an unlicensed band (LTE on unlicensed spectrum (LTE-U) or U-LTE) has been actively discussed recently.

SUMMARY OF THE INVENTION

Meanwhile, an entering condition of the legacy event W1 is applicable only before LTE-WLAN interworking activation, and is applicable only for a WLAN included in a measurement object. Therefore, a terminal may report a measurement result for a WLAN not included in the measurement object to a base station. In order to achieve the purpose of automatic neighbor relations (ANR), the measurement result for the WLAN not included in the measurement object also needs to be reported to the base station. However, at present, the terminal cannot report the measurement result for the WLAN not included in the measurement object to the base station. Accordingly, there is a need to propose a method of reporting the measurement result for the WLAN not included in the measurement object and an apparatus supporting the method.

In an embodiment, there is provided a method in which a terminal reports a measurement result in a wireless communication system. The method may include: receiving a measurement configuration including a measurement object and a reporting configuration, wherein the reporting configuration includes a first measurement report triggering condition to be applied to a first wireless local area network (WLAN) not included in the measurement object; determining that measurement reporting for the first WLAN not included in the measurement object is allowed; measuring the first WLAN not included in the measurement object; and reporting the measurement result for the first WLAN not included in the measurement object if the measurement result for the first WALN satisfies the first measurement report triggering condition.

If the first measurement report triggering condition is included in the reporting configuration, it may be determined that measurement reporting for the first WLAN not included in the measurement object is allowed. The reporting configuration may include a second measurement report triggering condition applied for a second WLAN included in the measurement object. The method may further include performing measurement on the second WLAN included in the measurement object if the second measurement report triggering condition is included in the reporting configuration.

The reporting configuration may include a measurement report allowing indicator indicating whether measurement reporting for the first WLAN not included in the measurement object is allowed. If the measurement report allowing indicator indicates that the measurement reporting for the first WLAN not included in the measurement object is allowed, it may be determined that measurement reporting for the first WLAN not included in the measurement object is allowed.

The first measurement report triggering condition may be satisfied if a value obtained by applying hysteresis to the measurement result for the first WLAN is greater than a predefined threshold.

The method may further include stopping reporting of the measurement result for the first WLAN not included in the measurement object if the measurement result for the first WLAN does not satisfy the first measurement report triggering condition. The first measurement report triggering condition may not be satisfied if a value obtained by applying hysteresis to the measurement result for the first WLAN is less than a predefined threshold.

The first measurement report triggering condition may be a condition to be applied for the first WLAN not included in the measurement object irrespective of whether a WLAN mobility set includes a WLAN ID.

In another embodiment, there is provided a terminal for reporting a measurement result in a wireless communication system. The terminal may include: a memory; a transceiver;

and a processor operatively coupling the memory and the transceiver. The processor may be configured to: control the transceiver to receive a measurement configuration including a measurement object and a reporting configuration; determine that measurement reporting for a first WLAN not included in the measurement object is allowed; measure the first WLAN not included in the measurement object; and control the transceiver to report the measurement result for the first WLAN not included in the measurement object if the measurement result for the first WALN satisfies the first measurement report triggering condition. The reporting configuration may include a first measurement report triggering condition applied for the first WLAN not included in the measurement object.

If the first measurement report triggering condition is included in the reporting configuration, it may be determined that measurement reporting for the first WLAN not included in the measurement object is allowed. The reporting configuration may include a second measurement report triggering condition applied for a second WLAN included in the measurement object. The processor may be configured to perform measurement on the second WLAN included in the measurement object if the second measurement report triggering condition is included in the reporting configuration.

The reporting configuration may include a measurement report allowing indicator indicating whether measurement reporting for the first WLAN not included in the measurement object is allowed.

A terminal can report a measurement result for an unlisted WLAN.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE.

For clarity, the following description will focus on LTE-A/5G. However, technical features of the present invention are not limited thereto.

Figure 1:
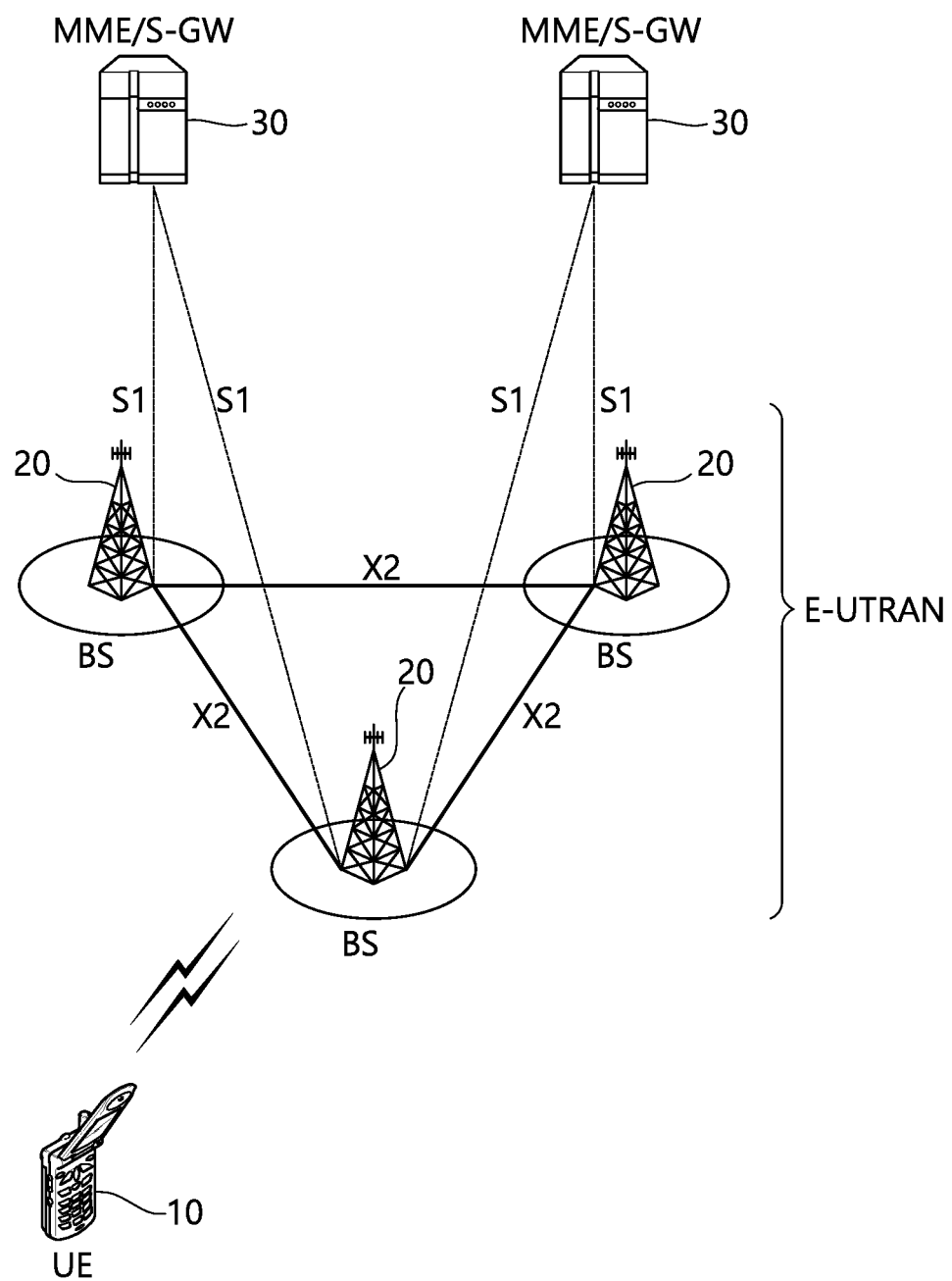
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
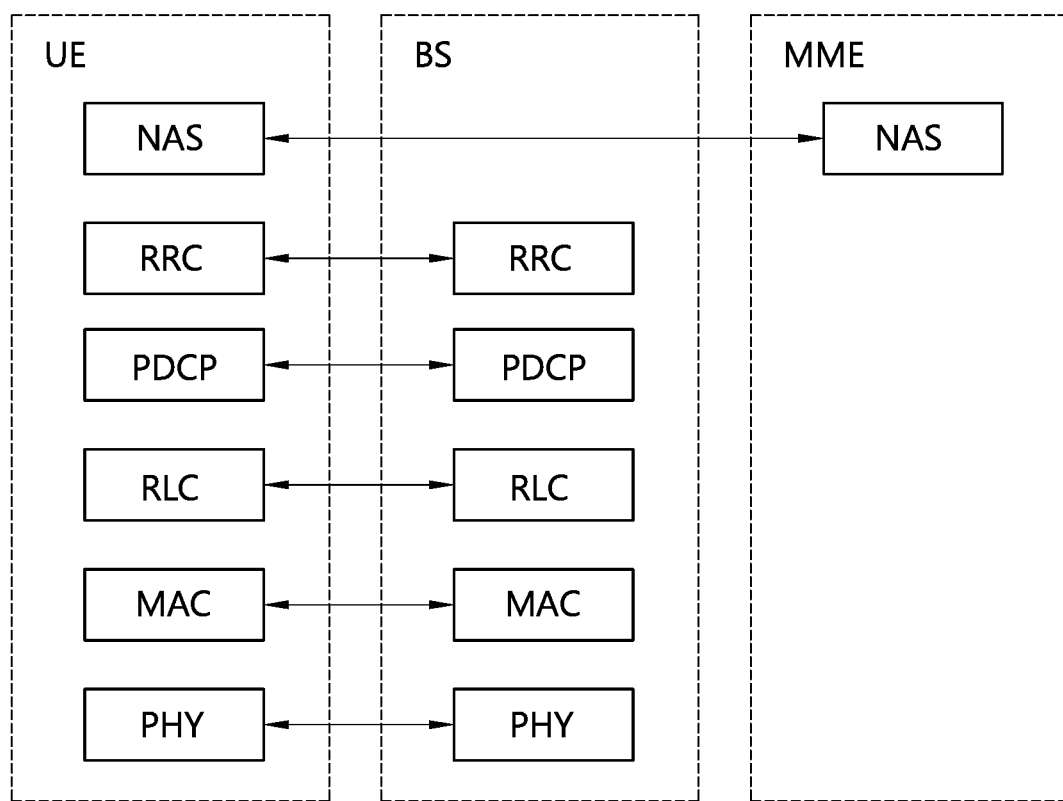
FIG. 2 shows a control plane of a radio interface protocol of an LTE system.
Figure 3:
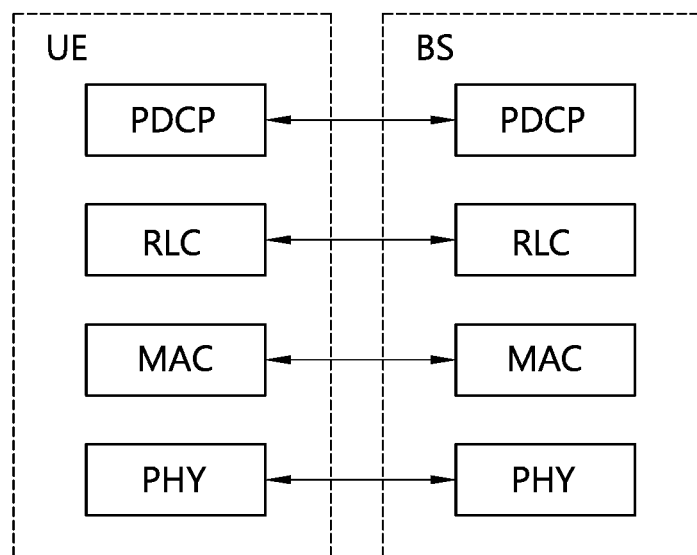
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/ multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
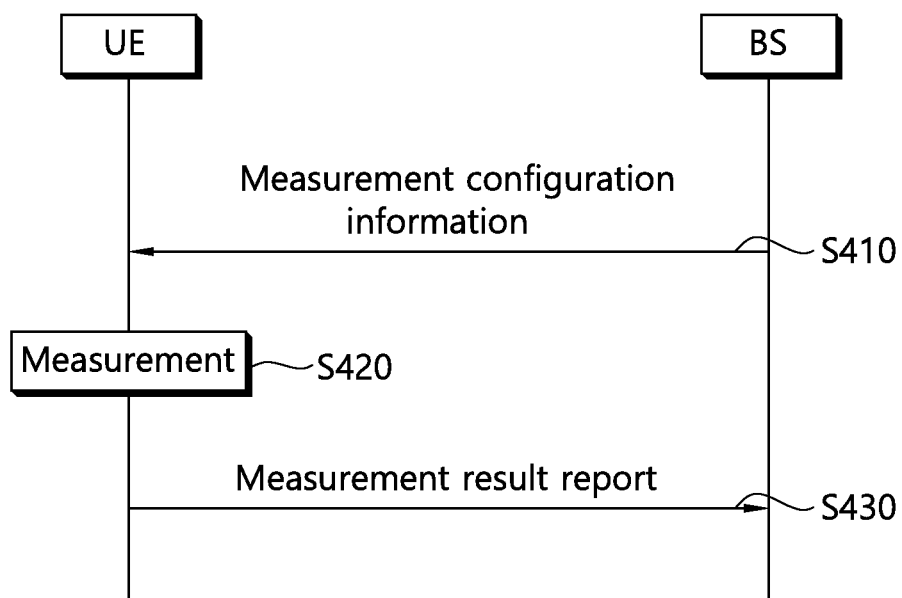
FIG. 4 shows a conventional method of performing measurement.

FIG. 4 shows a conventional method of performing measurement.

A UE receives measurement configuration information from a BS (S410). A message including the measurement configuration information is referred to as a measurement configuration message. The UE performs measurement based on the measurement configuration information (S420). If a measurement result satisfies a reporting condition included in the measurement configuration information, the UE reports the measurement result to the BS (S430). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighbour becomes offset better than PCell/PSCell |
| Event A4 | Neighbour becomes better than threshold |
| Event A5 | PCell/PSCell becomes worse than threshold1 and neighbor becomes better than threshold2 |
| Event A6 | Neighbour becomes offset better than SCell |
| Event B1 | Inter RAT neighbour becomes better than threshold |
| Event B2 | PCell becomes worse than threshold1 and inter RAT neighbor becomes better than threshold2 |
| Event C1 | CSI-RS resource becomes better than threshold |
| Event C2 | CSI-RS resource becomes offset better than reference CSI-RS resource |
| Event W1 | WLAN becomes better than a threshold |
| Event W2 | All WLAN inside WLAN mobility set becomes worse than threshold1 and a WLAN outside WLAN mobility set becomes better than threshold2 |
| Event W3 | All WLAN inside WLAN mobility set becomes worse than a threshold |

Figure 5:
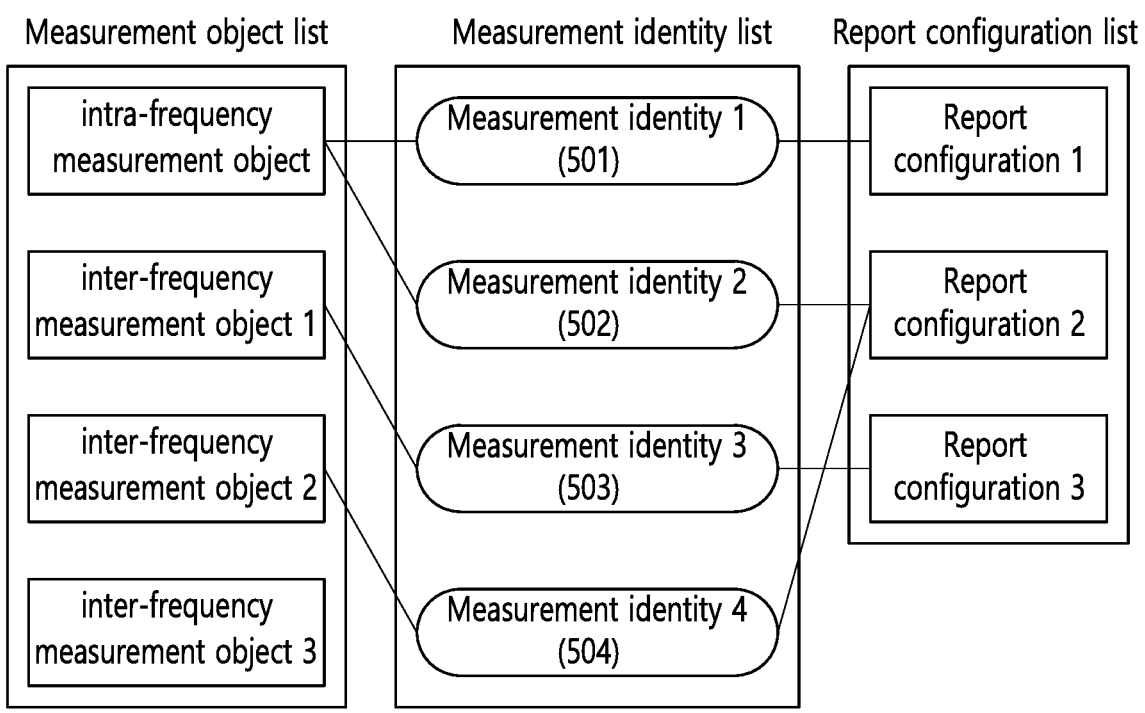
FIG. 5 shows an example of a measurement configuration assigned to a UE.

FIG. 5 shows an example of a measurement configuration assigned to a UE.

First, a measurement identity1 501 associates an intra-frequency measurement object with a reporting configuration 1. The UE performs intra-frequency measurement. The reporting configuration 1 is used to determine a reporting type and a criterion for reporting a measurement result.

A measurement identity2 502 is associated with the intra-frequency measurement object similarly to the measurement identifier1 501, and associates the intra-frequency measurement object with a reporting configuration 2. The UE performs intra-frequency measurement. The reporting configuration 2 is used to determine a reporting format and a criterion for reporting a measurement result.

By using the measurement identity1 501 and the measurement identity2 502, the UE transmits a measurement result even if the measurement result on the intra-frequency measurement object satisfies any one of the reporting configuration 1 and the reporting configuration 2.

A measurement identity3 503 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 504 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 6:
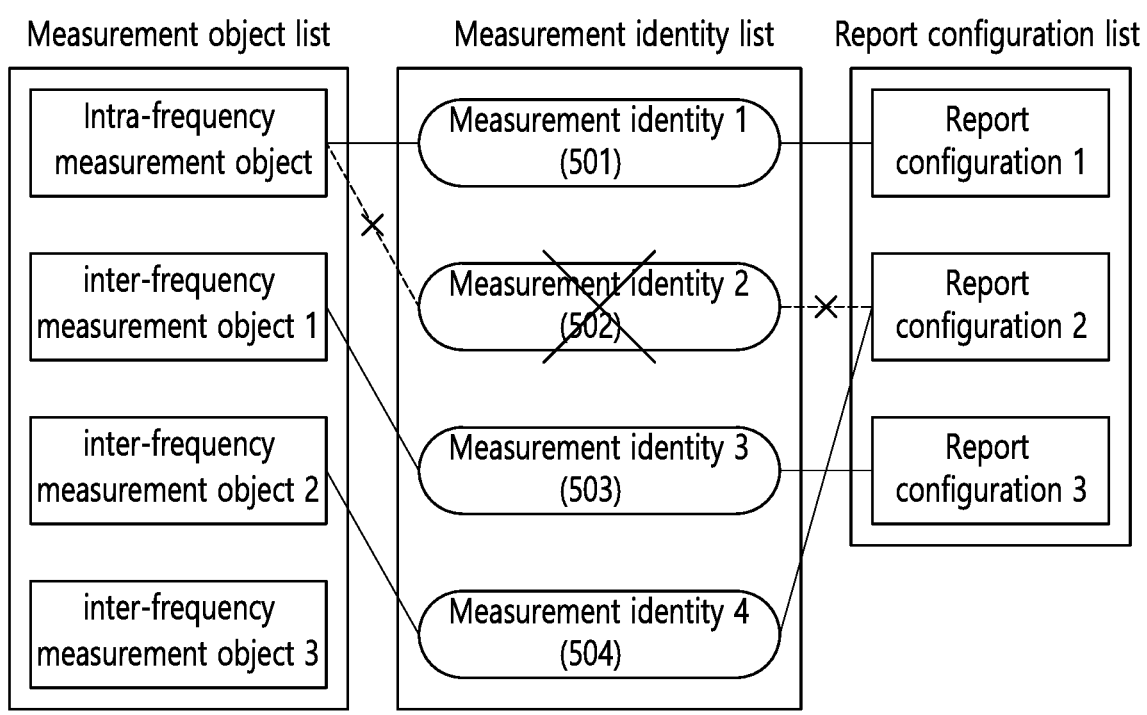
FIG. 6 shows an example of deleting a measurement identity.

FIG. 6 shows an example of deleting a measurement identity. When the measurement identity 2 502 is deleted, measurement for a measurement object associated with the measurement identity 2 502 is stopped and a measurement report is not transported. A measurement object or a reporting configuration associated with the deleted measurement identity may not be changed.

Figure 7:
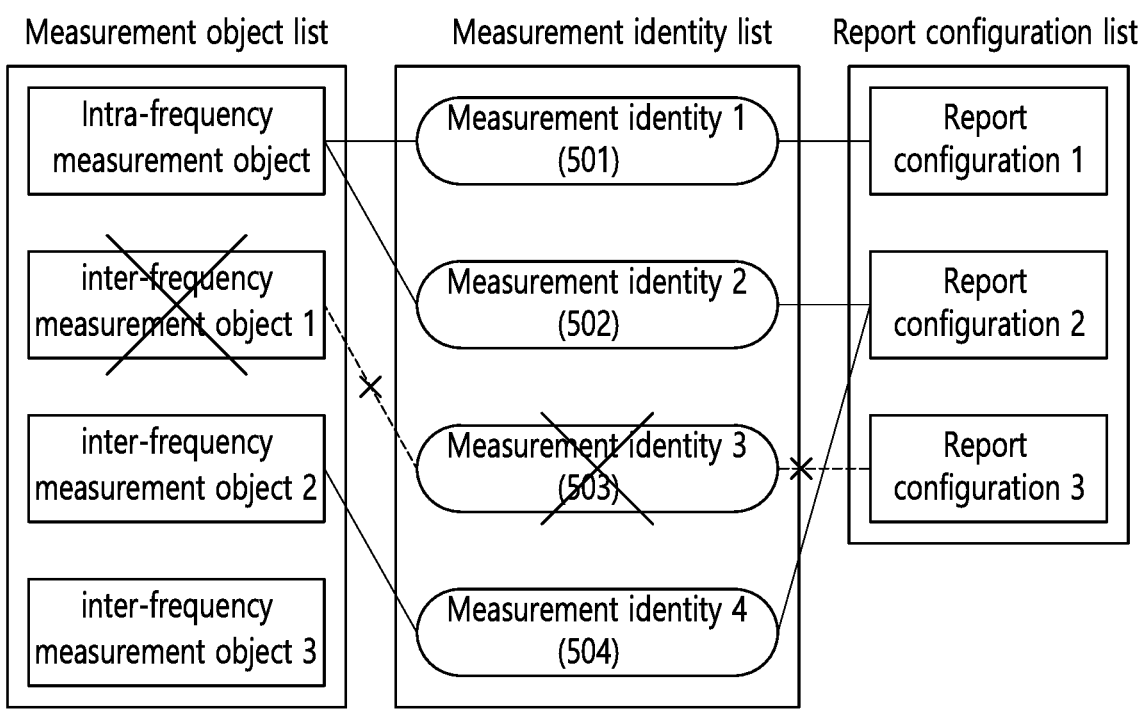
FIG. 7 shows an example of deleting the measurement object.

FIG. 7 shows an example of deleting the measurement object. When the inter-frequency measurement object 1 is deleted, the UE deletes even the measurement identity 3 503 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

Figure 8:
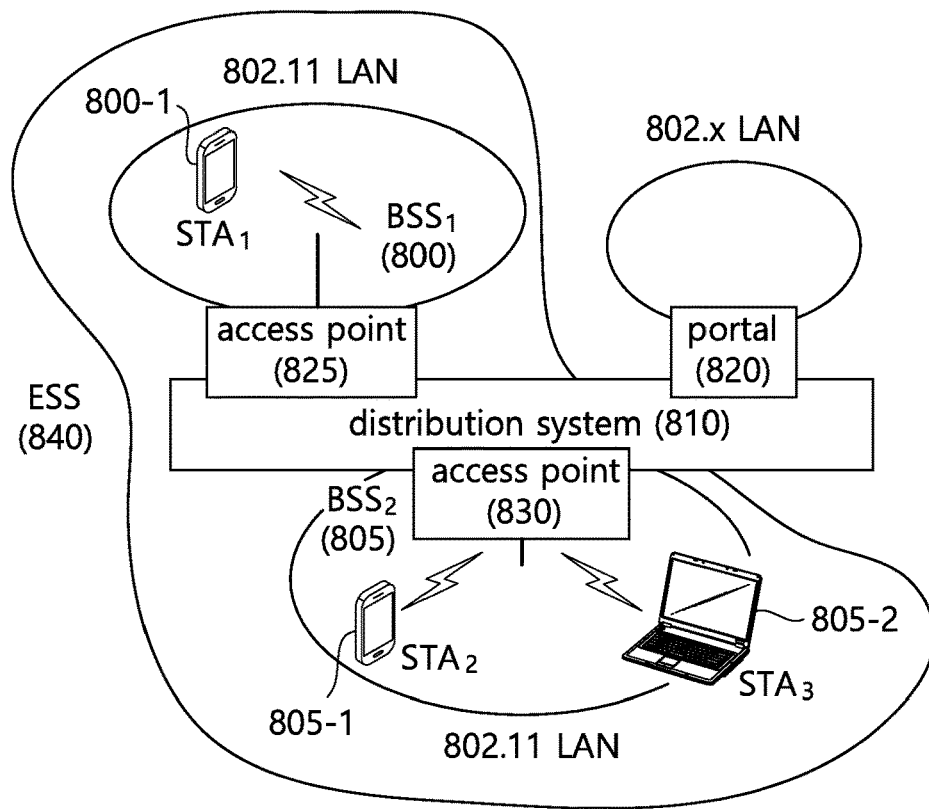
FIG. 8 illustrates the structure of a wireless local area network (WLAN).
Figure 8:
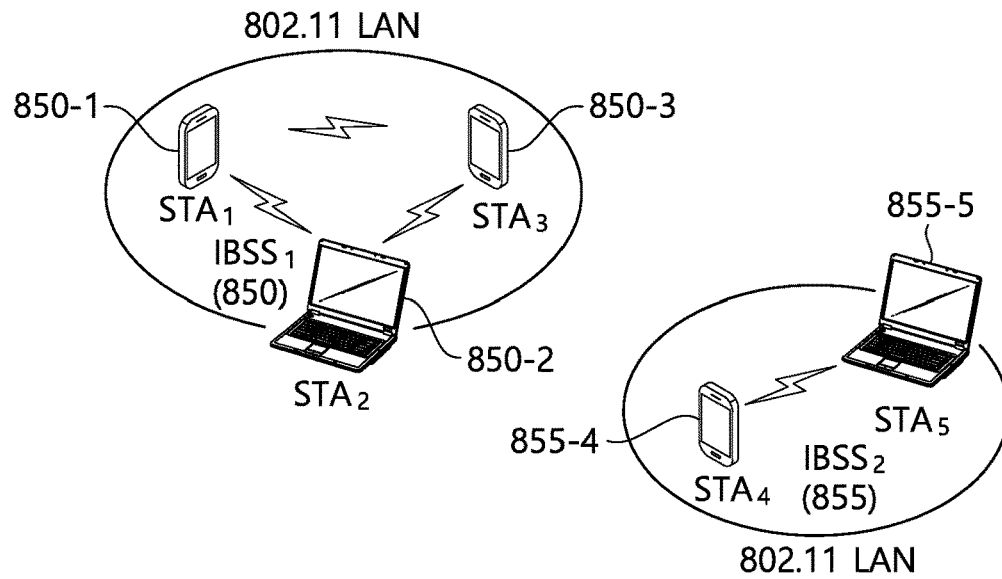

FIG. 8 illustrates the structure of a wireless local area network (WLAN). FIG. 8(a) illustrates the structure of an infrastructure network of Institute of Electrical and Electronics Engineers (IEEE) 802.11. FIG. 8(b) illustrates an independent BSS.

Referring the FIG. 8(a), a WLAN system may include one or more basic service sets (BSSs) 800 and 805. The BSSs 800 and 805 are a set of an access point (AP) and a station (STA), such as an AP 825 and STA1 800-1, which are successfully synchronized to communicate with each other, and are not a concept indicating a specific region. The BSS 805 may include one AP 830 and one or more STAs 805-1 and 805-2 that may be connected to the AP 830.

An infrastructure BSS may include at least one STA, APs 825 and 830 providing a distribution service, and a distribution system (DS) 810 connecting a plurality of APs.

The distribution system 810 may configure an extended service set (ESS) 840 by connecting a plurality of BSSs 800 and 805. The ESS 840 may be used as a term indicating one network configured by connecting one or more APs 825 or 830 through the distribution system 810. APs included in one ESS 840 may have the same service set identification (SSID).

A portal 820 may serve as a bridge that connects the WLAN (IEEE 802.11) and another network (for example, 802.X).

In the infrastructure network illustrated in the FIG. 8(a), a network between the APs 825 and 830 and a network between the APs 825 and 830 and the STAs 800-1, 805-1, and 805-2 may be configured. However, it is possible to configure a network between STAs in the absence of the APs 825 and 830 to perform communication. A network configured between STAs in the absence of the APs 825 and 830 to perform communication is defined as an ad hoc network or independent basic service set (BSS).

Referring to FIG. 8(b), an independent BSS (IBSS) is a BSS that operates in an ad hoc mode. The IBSS includes no AP and thus has no centralized management entity that performs a management function at the center. That is, in the IBSS, STAs 850-1, 850-2, 850-3, 855-4, and 855-5 are managed in a distributed manner. In the IBSS, all STAs 850-1, 850-2, 850-3, 855-4, and 855-5 may be mobile STAs. Further, the STAs are not allowed to access the DS and thus establish a self-contained network.

An STA is a functional medium including medium access control (MAC) and a physical layer interface for a radio medium according to IEEE 802.11 specifications and may be used to broadly mean both an AP and a non-AP STA.

An STA may also be referred to as various names, such as a mobile terminal, a wireless device, a wireless transmit/receive unit (WTRU), user equipment (UE), a mobile station (MS), a mobile subscriber unit, or simply a user.

Hereinafter, an Unlicensed Band Will be Described.

Figure 9:
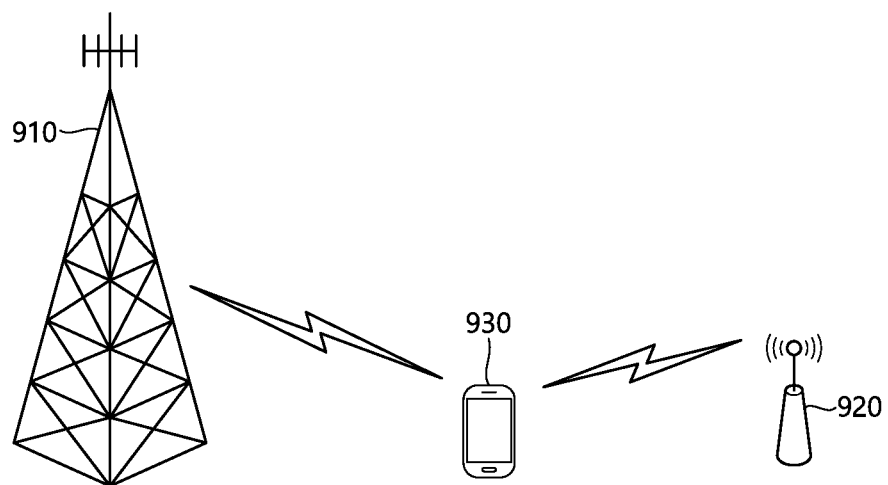
FIG. 9 shows an example of an LTE service using an unlicensed band.

FIG. 9 shows an example of an LTE service using an unlicensed band.

Referring to FIG. 9, a wireless device 930 establishes a connection with a first BS 910, and receives a service through a licensed band. For traffic offloading, the wireless device 930 may receive the service through an unlicensed band with respect to a second BS 920.

The first BS 910 is a BS supporting an LTE system, whereas the second BS 920 may support other communication protocols such as a wireless local area network (WLAN) or the like in addition to LTE. The first BS 910 and the second BS 920 may be coupled in a carrier aggregation (CA) environment, and a specific cell of the first BS 910 may be a primary cell. Alternatively, the first BS 910 and the second BS 920 may be coupled in a dual connectivity environment, and a specific cell of the first BS 910 may be a primary cell. In general, the first BS 910 having the primary cell has a wider coverage than the second BS 920. The first BS 910 may be referred to as a macro cell. The second BS 920 may be referred to as a small cell, a femto cell, or a micro cell. The first BS 910a may operate the primary cell and zero or more secondary cells. The second BS 920 may operate one or more secondary cells. The secondary cell may be activated/deactivated by an instruction of the primary cell. The aforementioned example is for exemplary purposes only, and thus the first BS 910 may correspond to the primary cell, and the second BS 920 may correspond to the secondary cell, so that the cell can be managed by one BS.

The licensed band is a band in which an exclusive use is guaranteed to a specific communication protocol or a specific provider. The unlicensed band is a band in which various communication protocols coexist and a shared use is guaranteed. The unlicensed band may include 2.5 GHz and/or 5 GHz band used in a WLAN.

Hereinafter, a Measurement Report Triggering Condition for a WLAN Will be Described.

13 types of event triggering conditions are defined (see Table 1) for a measurement report, and each event triggering condition has an entering condition and a leaving condition. A UE which satisfies an entering condition for a corresponding event from a BS may perform measurement reporting for the BS. When the UE which performs the measurement reporting satisfies a leaving condition for a corresponding event, the UE may stop the measurement reporting for the BS. An entering condition and leaving condition for an event applied for a WLAN are as follows.

(1) Event W1 (WLAN becomes better than a threshold)
Entering condition for event W1-1: Mn−Hys>Thresh
Leaving condition for event W1-2: Mn+Hys<Thresh Mn is a measurement result of a WLAN configured in a measurement object. Hys is a hysteresis parameter for the event W1. Thresh is a threshold parameter for the event W1.

Herein, only when wlan-MobilitySet within VarWLAN-MobilityConfig does not include any entry, the UE may determine whether a measurement result satisfies the entering condition of the event W1-1. That is, when a WLAN mobility set includes a WLAN ID, even if the measurement result for the WLAN satisfies the entering condition of the event W1-1, the UE cannot report the measurement result for the WLAN to the BS.

(2) Event W2 (All WLAN inside WLAN mobility set becomes worse than threshold1 and a WLAN outside WLAN mobility set becomes better than threshold2)

Entering condition for event W2-1: Ms+Hys<Thresh1
Entering condition for event W2-2: Mn−Hys>Thresh2
Leaving condition for event W2-3: Ms−Hys>Thresh1
Leaving condition for event W2-4: Mn+Hys<Thresh2

Ms is a measurement result of a WLAN which matches all WLAN identifiers of at least any one entry within MobilitySet of VarWLAN-MobilityConfig, not taking into account any offset. Mn is a measurement result of a WLAN configured for a measurement object which does not match all WLAN identifiers of any entry within wlan-MobilitySet of VarWLAN-MobilityConfig, not taking into account any offset. Hys is a hysteresis parameter for the event W2. Thresh1 is a threshold parameter for the event W2. Thresh2 is a threshold parameter for the event W2.

(3) Event W3 (All WLAN inside WLAN mobility set becomes worse than a threshold)

Entering condition for event W3-1: Ms+Hys<Thresh
Leaving condition for event W3-2: Ms−Hys>Thresh Ms is a measurement result of a WLAN which matches all WLAN identifiers of at least any one entry within wlan-MobilitySet of VarWLAN-MobilityConfig, not taking into account any offset. Hys is a hysteresis parameter for the event W3. Thresh is a threshold parameter for the event W3.

The measurement report triggering condition applied for the WLAN is described in detail in the section 5.5.4.11 to 5.5.4.13 of 3GPP TS 36.331 V13.2.0 (2016-06).

Meanwhile, as described above in the measurement report triggering condition applied for the WLAN, when a WLAN mobility set (MobilitySet) within VarWLAN-MobilityConfig does not include any entry and a measurement result for the WLAN satisfies the entering condition of the event W1-1, the UE may consider that the measurement result for the WLAN satisfies the entering condition for the event W1. That is, the entering condition for the event W1-1 may be applied only before LTE-WLAN interworking activation. Therefore, when the WLAN mobility set includes at least any one of entries (e.g., WLAN ID), even if the measurement result for the WLAN satisfies the entering condition of the event W1-1, the UE cannot report the measurement result for the WLAN to the BS. This is because, at present, the purpose of the event W1 is to activate LTE-WLAN interworking.

However, for the purpose of automatic neighbor relations (ANR), not only a listed WLAN but also an unlisted WLAN needs to be reported during an LTE-WLAN interworking operation. Therefore, there is a need to propose a measurement report triggering condition for the unlisted WLAN. Hereinafter, a method in which a UE reports a measurement result for an unlisted WLAN, and an apparatus supporting the method will be described in detail according to an embodiment of the present invention.

In the present specification, the unlisted WLAN may imply a WLAN not included in a measurement object. For example, if an identity of a first WLAN is not included in the measurement object, the first WLAN may be referred to as the unlisted WLAN. On the other hand, in the present specification, the listed WLAN may imply a WLAN included in the measurement object. For example, if an identity of a second WLAN is included in the measurement object, the second WLAN may be referred to as the listed WLAN.

According to an embodiment of the present invention, a measurement report triggering condition W1a applied for the WLAN may be defined by Table 2.

TABLE 2

Event W1a (Unlisted WLAN becomes better than a threshold)
The UE shall:
1> consider the entering condition for this event to be satisfied
when condition W1a-1, as
specified below, is fulfilled;
1> consider the leaving condition for this event to be satisfied
when condition W1a-2, as specified below, is fulfilled;
Inequality W1a-1 (Entering condition)
Mn − Hys > Thresh
Inequality W1a-2 (Leaving condition)
Mn + Hys < Thresh
The variables in the formula are defined as follows:
Mn is the measurement result of WLAN(s) not configured in the
measurement object, not taking into account any offsets.
Hys is the hysteresis parameter for this event.
Thresh is the threshold parameter for this event (i.e. w1a-Threshold
as defined within
reportConfigInterRAT for this event).
Mn is expressed in dBm.
Hys is expressed in dB.
Thresh is expressed in the same unit as Mn.

Referring to Table 2, if a value obtained by applying the hysteresis parameter to the measurement result of the WLAN not configured in the measurement object is greater than the threshold parameter, the UE may consider that the entering condition for the event W1a is satisfied. In addition, if a value obtained by applying the hysteresis parameter to the measurement result of the WLAN not configured in the measurement object is less than the threshold parameter, the UE may consider that the leaving condition for the event W1a is satisfied.

The existing event W1 is applied when the entry is not included in the WLAN mobility set. Further, the existing event W1 is applied only for the WLAN configured in the measurement object. Therefore, according to the existing event W1, the UE cannot report the measurement result for the unlisted WLAN. On the other hand, in the event W1a proposed according to the embodiment of the present invention, the UE can report the measurement result for the unlisted WLAN irrespective of whether the entry is included in the WLAN mobility set.

Figure 10:
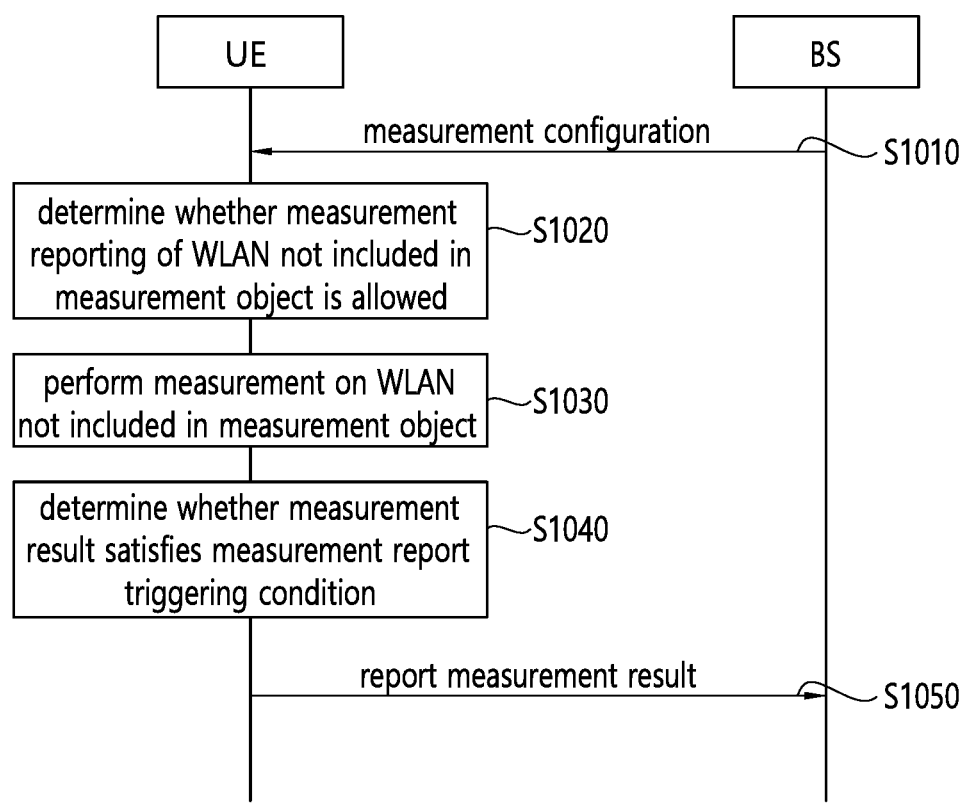
FIG. 10 shows a procedure in which a UE reports a measurement result for an unlisted WLAN according to an embodiment of the present invention.

FIG. 10 shows a procedure in which a UE reports a measurement result for an unlisted WLAN according to an embodiment of the present invention.

Referring to FIG. 10, in step S1010, the UE may receive a measurement configuration from a BS. The measurement configuration may include a measurement object and a reporting configuration. The UE may be a UE which is allowed to perform unlisted WLAN measurement and reporting.

In step S1020, the UE may determine whether the unlisted WLAN measurement reporting is allowed.

Whether the unlisted WLAN measurement reporting is allowed may be determined based on an explicit indicator. The explicit indicator may be referred to as a measurement report allowing indicator, UnlistedCellReport or reportAnyWLAN. The explicit indicator may be included in the reporting configuration. If the explicit indicator indicates that the unlisted WLAN measurement reporting is allowed, the UE may determine that the unlisted WLAN measurement reporting is allowed. Otherwise, if the explicit indicator indicates that the unlisted WLAN measurement reporting is prohibited, the UE may determine that the unlisted WLAN measurement reporting is not allowed. For example, according to the procedure of Table 3, the UE may determine whether the unlisted WLAN measurement reporting is allowed.

TABLE 3

The UE shall:
1> for each measId included in the measIdList within VarMeasConfig:
    2> if the corresponding measObject concerns WLAN;
        3> if the corresponding reportConfig includes UnlistedCellReport:
            4> consider any WLAN on the associated set of frequencies, as indicated by carrierFreq or on all WLAN frequencies when carrierFreq is not present, to be applicable;
        3> else:
            4> consider a WLAN on the associated set of frequencies, as indicated by carrierFreq or on all WLAN frequencies when carrierFreq is not present, to be applicable if the WLAN matches all WLAN identifiers of at least one entry within wlan-Id-List for this measId;

Referring to Table 3, for each measurement identity included in the measurement identity within the measurement configuration, if the corresponding measurement object relates to WLAN and if the corresponding reporting configuration includes an indicator which allows unlisted cell reporting, the UE may determine that the unlisted WLAN reporting is allowed. Otherwise, the UE may determine that the unlisted WLAN reporting is not allowed.

Whether the unlisted WLAN measurement reporting is allowed may be determined based on a configured event. The configured event may be included in the reporting configuration. If a measurement report triggering condition (e.g., event W1a) applied for the WLAN not included in the measurement object is included in the reporting configuration, the UE may determine that the unlisted WLAN measurement reporting is allowed. Otherwise, if the measurement report triggering condition (e.g., event W1a) applied for the WLAN not included in the measurement object is not included in the reporting configuration, the UE may determine that the unlisted WLAN measurement reporting is not allowed. For example, according to the procedure of Table 4, the UE may determine whether the unlisted WLAN measurement reporting is allowed.

unlisted WLAN measurement. Therefore, the UE may perform not only the listed WLAN measurement but also the unlisted WLAN measurement. Otherwise, if it is determined that the unlisted WLAN measurement reporting is not allowed, the UE may perform only the listed WLAN measurement.

In step S1040, the UE may determine whether a measurement result for the unlisted WLAN satisfies a measurement report triggering condition applied for the unlisted WLAN. For example, the measurement report triggering condition applied for the unlisted WLAN may be the event W1a. The UE may use the event W1a, instead of the event W1, to determine whether the measurement result for the unlisted WLAN satisfies the measurement report triggering condition.

Further, the UE may determine whether the measurement result for the listed WLAN satisfies the measurement report triggering condition applied for the listed WLAN. For example, the measurement report triggering condition applied for the listed WLAN may be the event W1.

In step S1050, if the measurement result for the unlisted WLAN satisfies the measurement report triggering condition applied for the unlisted WLAN, the UE may report the measurement result for the unlisted WLAN to the BS. Otherwise, if the measurement result for the unlisted WLAN does not satisfy the measurement report triggering condition

TABLE 4

The UE shall:
1> for each measId included in the measIdList within VarMeasConfig:
    2> if the corresponding measObject concerns WLAN;
        3> if the event relevant for unlisted WLAN or ANR, i.e. eventW1' is configured in the corresponding reportConfig:
            4> consider any WLAN on the associated set of frequencies, as indicated by carrierFreq or on all WLAN frequencies when carrierFreq is not present, to be applicable;
        3> else:
            4> consider a WLAN on the associated set of frequencies, as indicated by carrierFreq or on all WLAN frequencies when carrierFreq is not present, to be applicable if the WLAN matches all WLAN identifiers of at least one entry within wlan-Id-List for this measId;

Referring to Table 4, for each measurement identity included in the measurement identity within the measurement configuration, if the corresponding measurement object relates to WLAN and if the event relevant for the unlisted WLAN or ANR is configured in the corresponding reporting configuration, the UE may determine that the unlisted WLAN reporting is allowed. Otherwise, the UE may determine that the unlisted WLAN reporting is not allowed.

In step S1030, if it is determined that the unlisted WLAN measurement reporting is allowed, the UE may perform the applied for the unlisted WLAN, the UE may not report the measurement result for the unlisted WLAN to the BS.

Figure 11:
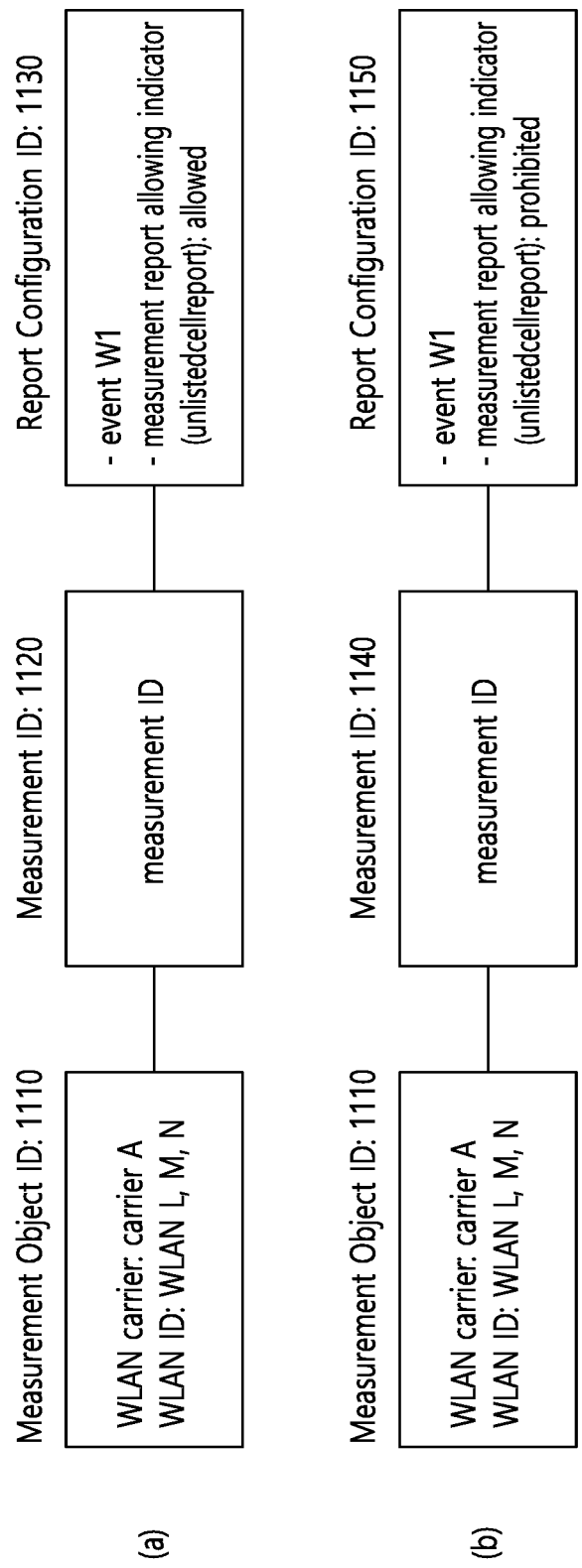
FIG. 11 is a drawing for explaining a method in which a UE reports a measurement result for an unlisted WLAN on the basis of an explicit indicator, according to an embodiment of the present invention.

FIG. 11 is a drawing for explaining a method in which a UE reports a measurement result for an unlisted WLAN on the basis of an explicit indicator, according to an embodiment of the present invention.

In the embodiment of FIG. 11, it is assumed that WLAN L, WLAN M, WLAN N, WLAN O, and WLAN P are on a carrier A. It is assumed that the WLAN L, the WLAN M, and the WLAN N are listed in a measurement object, whereas the WLAN O and the WLAN P are not listed in the measurement object. A reporting configuration may include a measurement report allowing indicator indicating whether unlisted WLAN measurement reporting is allowed.

Referring to FIG. 11(a), a measurement object 1110 may be mapped to a reporting configuration 1130 by using a measurement identity 1120, and a measurement report allowing indicator may indicate that unlisted WLAN measurement reporting is allowed. Therefore, the UE may consider that the measurement report triggering condition is applicable not only for the listed WLAN L, WLAN M, and WLAN N but also for the unlisted WLAN O and WLAN P. Thereafter, the UE may use the event W1 to evaluate measurement results of the listed WLAN L, WLAN M, and WLAN N. In addition, the UE may use the event W1a to evaluate measurement results of the unlisted WLAN O and WLAN P.

Referring to FIG. 11(b), the measurement object 1110 may be mapped to a reporting configuration 1150 by using a measurement identity 1140, and a measurement report allowing indicator may indicate that unlisted WLAN measurement reporting is prohibited. Therefore, the UE may consider that a measurement report triggering condition is applicable only for listed WLAN L, WLAN M, and WLAN N, but may consider that the measurement report triggering condition is not applicable for unlisted WLAN O and WLAN P. Thereafter, the UE may use the event W1 to evaluate measurement results of only the listed WLAN L, WLAN M, and WLAN N.

Figure 12:
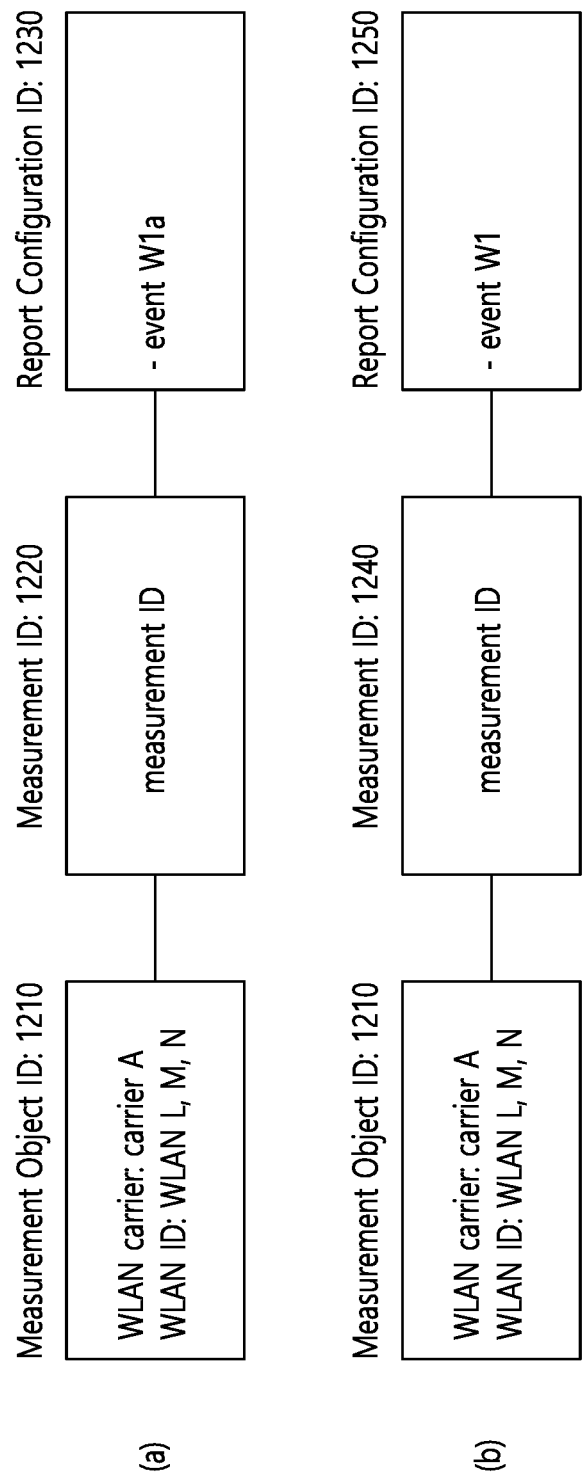
FIG. 12 is a drawing for explaining a method in which a UE reports a measurement result for an unlisted WLAN on the basis of a configured event.

FIG. 12 is a drawing for explaining a method in which a UE reports a measurement result for an unlisted WLAN on the basis of a configured event.

In the embodiment of FIG. 12, it is assumed that WLAN L, WLAN M, WLAN N, WLAN O, and WLAN P are on a carrier A. It is assumed that the WLAN L, the WLAN M, and the WLAN N are listed in a measurement object, whereas the WLAN O and the WLAN P are not listed in the measurement object.

Referring to FIG. 12(a), a measurement object 1210 may be mapped to a reporting configuration 1230 by using a measurement identity 1220, and the reporting configuration 1230 may include the event W1a. Since the reporting configuration 1230 includes the event W1a applied for the WLAN not included in the measurement object, the UE which has received the reporting configuration 1230 may know that unlisted WLAN measurement reporting is allowed. Therefore, the UE may consider that the measurement report triggering condition is applicable not only for the listed WLAN L, WLAN M, and WLAN N but also for the unlisted WLAN O and WLAN P. Thereafter, the UE may use the event W1 to evaluate measurement results of the listed WLAN L, WLAN M, and WLAN N. In addition, the UE may use the event W1a to evaluate measurement results of the unlisted WLAN O and WLAN P.

Referring to FIG. 12(b), a measurement object 1210 may be mapped to a reporting configuration 1250 by using a measurement identity 1240, and the reporting configuration 1250 may include only the event W1 and may not include the event W1a. Since the reporting configuration 1250 does not include the event W1a applied for the WLAN not included in the measurement object, the UE which has received the reporting configuration 1250 may know that unlisted WLAN measurement reporting is prohibited. Therefore, the UE may consider that the measurement report triggering condition is applicable only for the listed WLAN L, WLAN M, and WLAN N, and may consider that the measurement report triggering condition is not applicable for the unlisted WLAN O and WLAN P. Thereafter, the UE may use the event W1 to evaluate measurement results of the listed WLAN L, WLAN M, and WLAN N.

According to an embodiment of the present invention, a UE may determine whether to measure a WLAN not configured in a measurement object on the basis of information included in the reporting configuration. The information included in the reporting configuration may be at least any one of an explicit indicator and an event applied for the WLAN not included in the measurement object. Further, if it is determined to measure the WLAN not configured in the measurement object, the UE may report a measurement result for the WLAN not configured in the measurement object to a BS.

Figure 13:
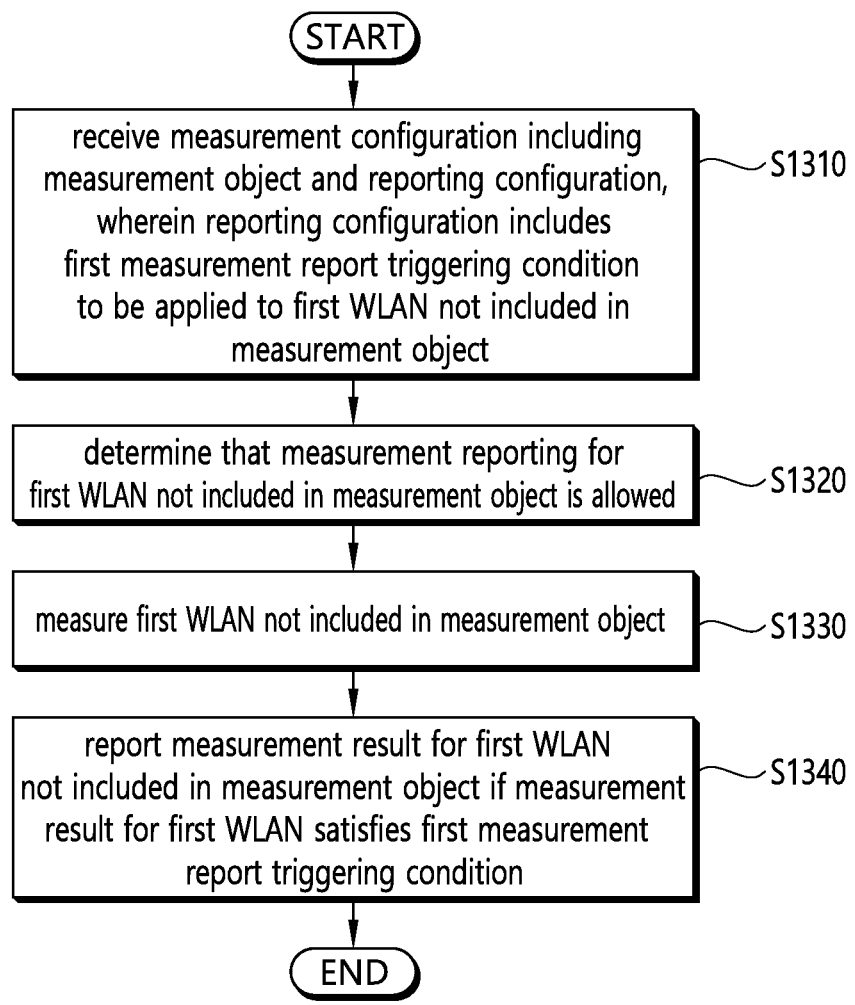
FIG. 13 is a block diagram showing a method in which a UE reports a measurement result according to an embodiment of the present invention.

FIG. 13 is a block diagram showing a method in which a UE reports a measurement result according to an embodiment of the present invention.

Referring to FIG. 13, in step S1310, the UE may receive a measurement configuration including a measurement object and a reporting configuration. The reporting configuration may include a first measurement report triggering condition to be applied to a first wireless local area network (WLAN) not included in the measurement object. The first measurement report triggering condition may be a condition to be applied for the first WLAN not included in the measurement object irrespective of whether a WLAN mobility set includes a WLAN ID.

In addition, the reporting configuration may include a second measurement report triggering condition applied for a second WLAN included in the measurement object. If the second measurement report triggering condition is included in the reporting configuration, the UE may perform measurement on the second WLAN included in the measurement object.

In addition, the reporting configuration may include a measurement report allowing indicator indicating whether measurement reporting for the first WLAN not included in the measurement object is allowed. If the measurement report allowing indicator indicates that the measurement reporting for the first WLAN not included in the measurement object is allowed, it may be determined that measurement reporting for the first WLAN not included in the measurement object is allowed.

In step S1320, the UE may determine that measurement reporting for the first WLAN not included in the measurement object is allowed. If the first measurement report triggering condition is included in the reporting configuration, it may be determined that measurement reporting for the first WLAN not included in the measurement object is allowed.

In step S1330, the UE may measure the first WLAN not included in the measurement object.

In step S1340, if the measurement result for the first WALN satisfies the first measurement report triggering condition, the UE may report the measurement result for the first WLAN not included in the measurement object. The first measurement report triggering condition may be satisfied if a value obtained by applying hysteresis to the measurement result for the first WLAN is greater than a predefined threshold.

In addition, the UE may stop reporting of the measurement result for the first WLAN not included in the measurement object if the measurement result for the first WLAN does not satisfy the first measurement report triggering condition. The first measurement report triggering condition may not be satisfied if a value obtained by applying hysteresis to the measurement result for the first WLAN is less than a predefined threshold.

Figure 14:
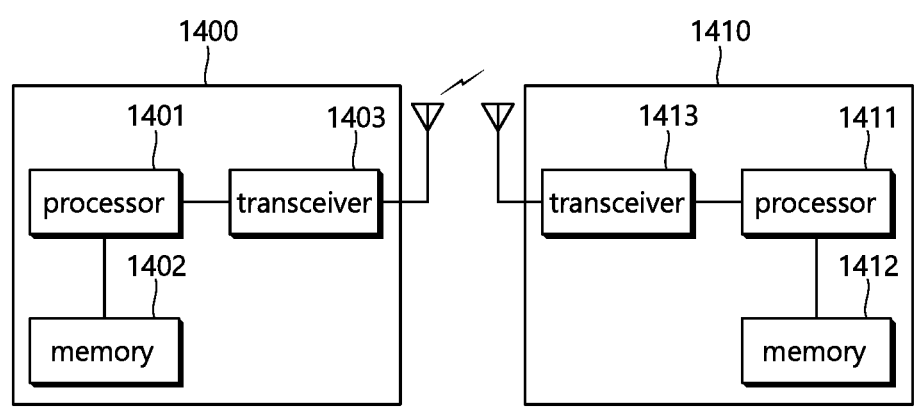
FIG. 14 is a block diagram illustrating a wireless communication system according to the embodiment of the present invention.

FIG. 14 is a block diagram illustrating a wireless communication system according to the embodiment of the present invention.

A BS 1400 includes a processor 1401, a memory 1402 and a transceiver 1403. The memory 1402 is connected to the processor 1401, and stores various information for driving the processor 1401. The transceiver 1403 is connected to the processor 1401, and transmits and/or receives radio signals. The processor 1401 implements proposed functions, processes and/or methods. In the above embodiment, an operation of the base station may be implemented by the processor 1401.

A UE 1410 includes a processor 1411, a memory 1412 and a transceiver 1413. The memory 1412 is connected to the processor 1411, and stores various information for driving the processor 1411. The transceiver 1413 is connected to the processor 1411, and transmits and/or receives radio signals. The processor 1411 implements proposed functions, processes and/or methods. In the above embodiment, an operation of the UE may be implemented by the processor 1411.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method in which a terminal reports a measurement result in a wireless communication system, the method comprising:
receiving a measurement configuration comprising a measurement object and a reporting configuration,
wherein the measurement object does not comprise a first wireless local area network (WLAN),
wherein the measurement object comprises a second WLAN, and
wherein the reporting configuration comprises a first measurement report triggering condition to be applied to i) the first WLAN not comprised in the measurement object and ii) the second WLAN comprised in the measurement object;
determining that measurement reporting for the first WLAN not comprised in the measurement object is allowed, based on the first measurement report triggering condition comprised in the reporting configuration;
measuring the first WLAN not comprised in the measurement object and the second WLAN comprised in the measurement object; and
reporting a measurement result for the first WLAN not comprised in the measurement object, based on the measurement result for the first WLAN satisfying the first measurement report triggering condition.

2. The method of claim 1, wherein the reporting configuration comprises a second measurement report triggering condition that applies to the second WLAN comprised in the measurement object.

3. The method of claim 2, further comprising:
performing a measurement on the second WLAN comprised in the measurement object, based on the second measurement report triggering condition comprised in the reporting configuration.

4. The method of claim 1, wherein the reporting configuration comprises a measurement report allowing indicator informing the terminal whether measurement reporting for the first WLAN not comprised in the measurement object is allowed.

5. The method of claim 4, wherein based on the measurement report allowing indicator which informs the terminal that measurement reporting for the first WLAN not comprised in the measurement object is allowed, determining that measurement reporting for the first WLAN not comprised in the measurement object is allowed.

6. The method of claim 1, wherein the first measurement report triggering condition is satisfied based on a value obtained by applying a hysteresis to the measurement result for the first WLAN which is greater than a predefined threshold.

7. The method of claim 1, further comprising:
stopping the reporting of the measurement result for the first WLAN not comprised in the measurement object, based on the measurement result for the first WLAN not satisfying the first measurement report triggering condition.

8. The method of claim 7, wherein the first measurement report triggering condition is not satisfied based on a value obtained by applying a hysteresis to the measurement result for the first WLAN which is less than a predefined threshold.

9. The method of claim 1, wherein the first measurement report triggering condition is a condition to be applied for the first WLAN not comprised in the measurement object irrespective of whether a WLAN mobility set comprises a WLAN ID.

10. The method of claim 1 further comprising:
reporting a measurement result for the second WLAN comprised in the measurement object, based on the measurement result for the second WALN satisfying the first measurement report triggering condition.

11. A terminal for reporting a measurement result in a wireless communication system, the terminal comprising:

a memory; a transceiver; and a processor operatively coupling the memory and the transceiver, wherein the processor is configured to:

control the transceiver to receive a measurement configuration comprising a measurement object and a reporting configuration, wherein the measurement object does not comprise a first wireless local area network (WLAN), wherein the measurement object comprises a second WLAN, and wherein the reporting configuration comprises a first measurement report triggering condition to be applied to i) the first WLAN not comprised in the measurement object and ii) the second WLAN comprised in the measurement object;

determine that measurement reporting for a first wireless local area network (WLAN) not comprised in the measurement object is allowed, based on the first measurement report triggering condition comprised in the reporting configuration;

measure the first WLAN not comprised in the measurement object and the second WLAN comprised in the measurement object; and control the transceiver to report a measurement result for the first WLAN not comprised in the measurement object, based on the measurement result for the first WALN satisfying the first measurement report triggering condition.

12. The terminal of claim 11, wherein the reporting configuration comprises a second measurement report triggering condition that applies to the second WLAN comprised in the measurement object.

13. The terminal of claim 12, wherein the processor is further configured to perform a measurement on the second WLAN comprised in the measurement object, based on the second measurement report triggering condition comprised in the reporting configuration.

14. The terminal of claim 11, wherein the reporting configuration comprises a measurement report allowing indicator informing the terminal whether measurement reporting for the first WLAN not comprised in the measurement object is allowed.

15. The terminal of claim 11, wherein the processor is further configured to:

control the transceiver to report a measurement result for the second WLAN comprised in the measurement object, based on the measurement result for the second WALN satisfying the first measurement report triggering condition.

* * * * *